Sept. 5, 1933.   H. R. STANDLEE   1,925,853
OIL SAVER
Filed Aug. 8, 1930   6 Sheets-Sheet 5

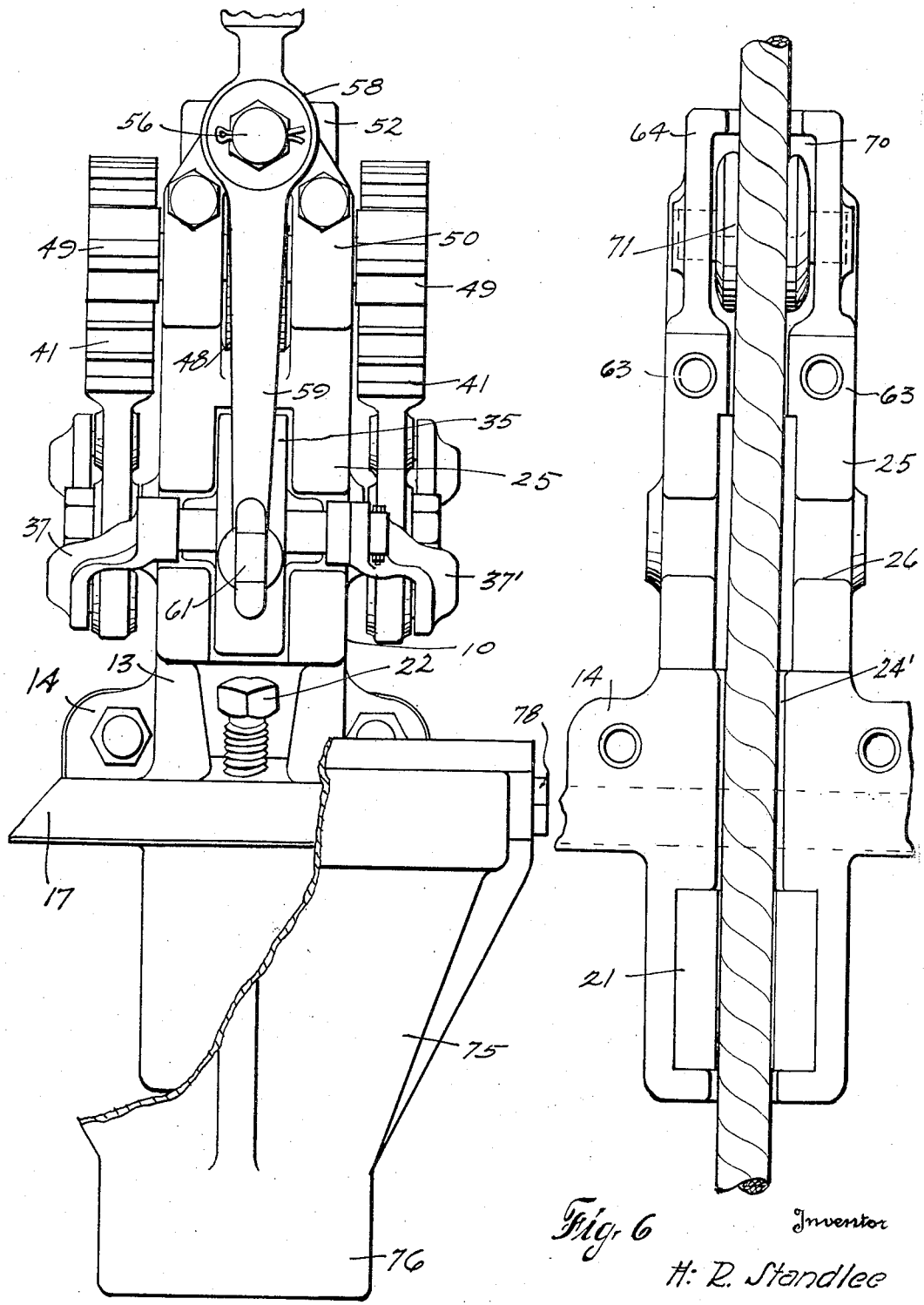

Inventor
H. R. Standlee
By Jack A. Ashley
Attorney

Sept. 5, 1933.　　　H. R. STANDLEE　　　1,925,853
OIL SAVER
Filed Aug. 8, 1930　　　6 Sheets-Sheet 6

Inventor
H. R. Standlee
By
Jack A. Schley
Attorney

Patented Sept. 5, 1933

1,925,853

UNITED STATES PATENT OFFICE 1,925,853

OIL SAVER

Harvey R. Standlee, Tulsa, Okla., assignor to The Guiberson Corporation, Dallas, Tex., a corporation of Delaware Application August 8, 1930. Serial No. 473,976

6 Claims. (Cl. 286—16)

This invention relates to new and useful improvements in oil savers.

The invention has particularly to do with improvements upon the structure shown in my co-pending application Serial No. 402,851, filed October 28, 1929.

One object of the invention is to arrange the gear segments so that they will be elevated and out of the way when the parts are in position to change the packing members.

Another object of the invention is to so mount the packing members that they may be quickly and easily changed.

A further object of the invention is to simplify the structure by the elimination of pins, rivets, and the like, and to reduce the number of parts, thus making for simplicity and economy in production.

Still another object of the invention is to provide removable guide roller housings which may be easily replaced.

Another object of the invention is to provide an operating handle which serves also as a wrench fitting every bolt and like part on the device.

A construction designed to carry out the invention will be hereinafter described together with other features of the invention.

Figure 1:
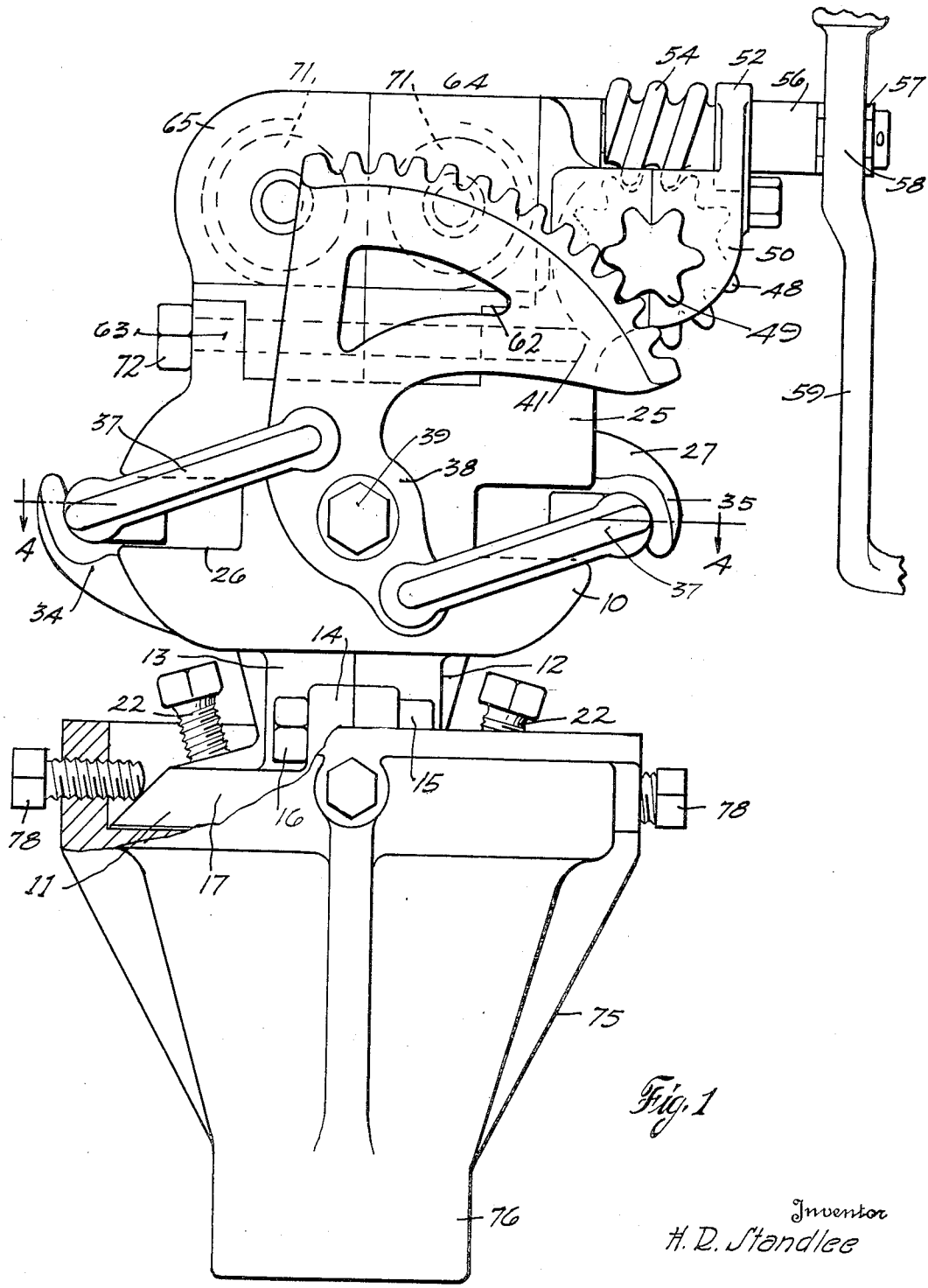
Figure 2:
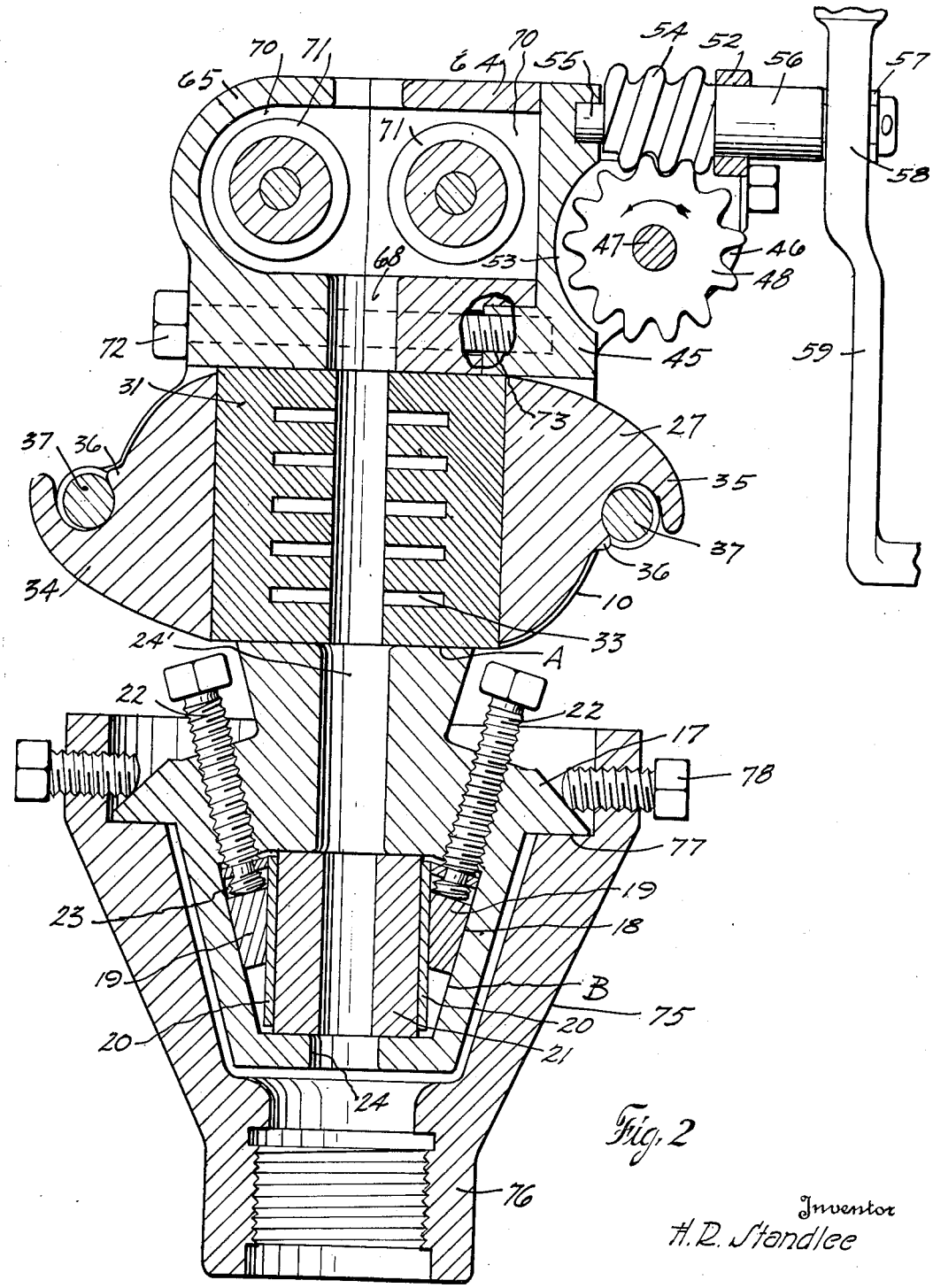
Figure 3:
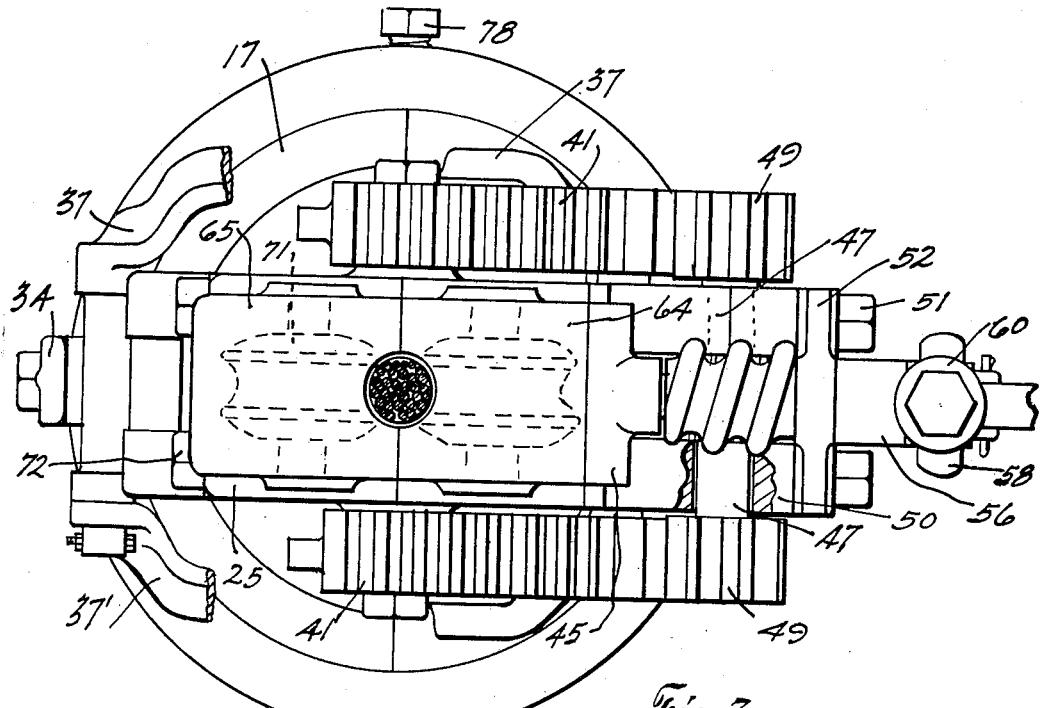
Figure 4:
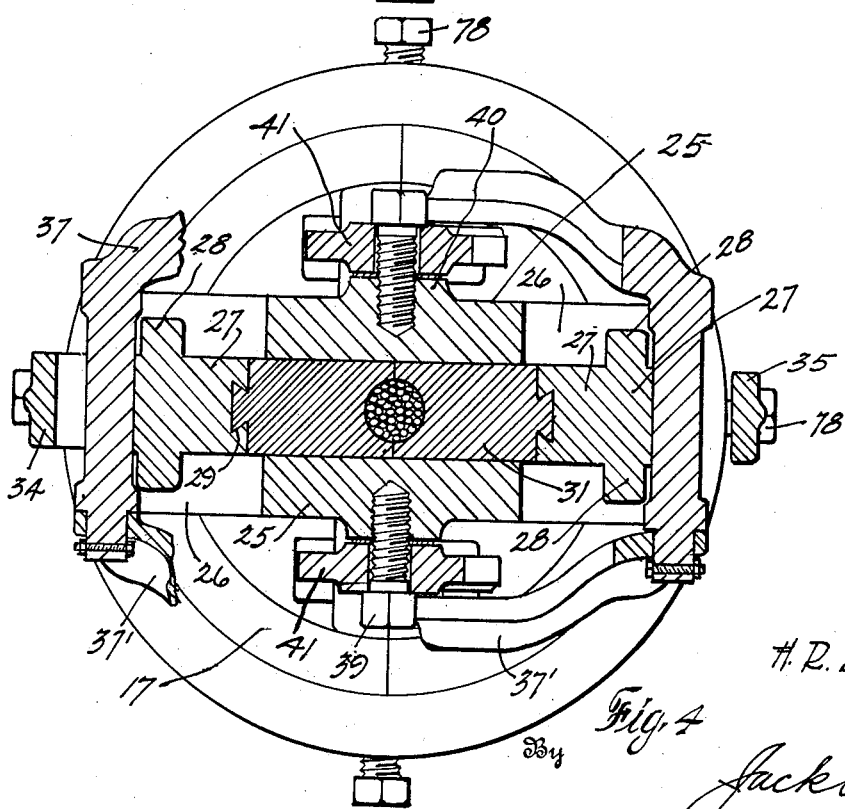
Figures 7, 8:
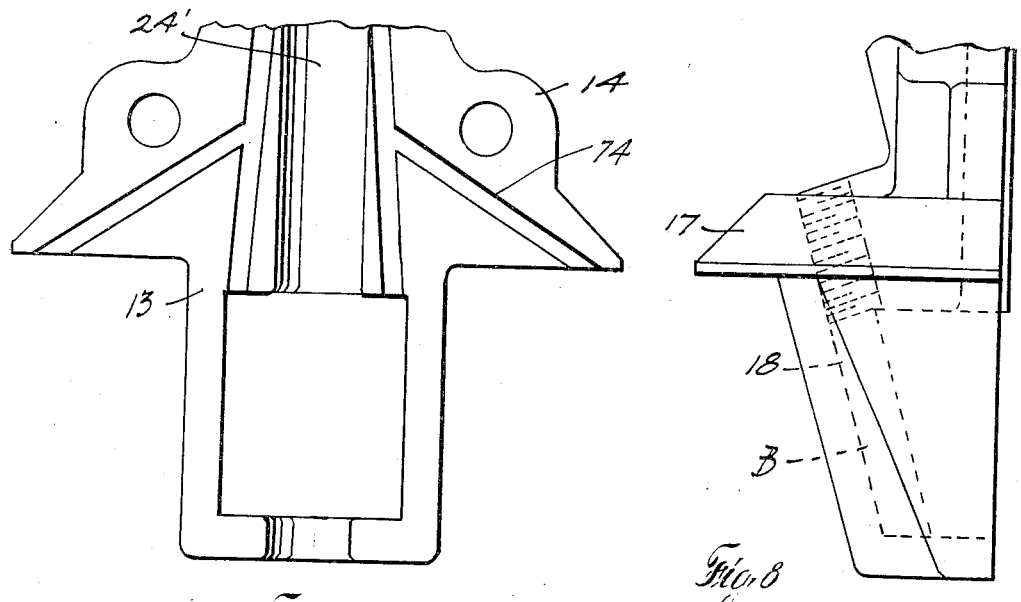
Figure 16:
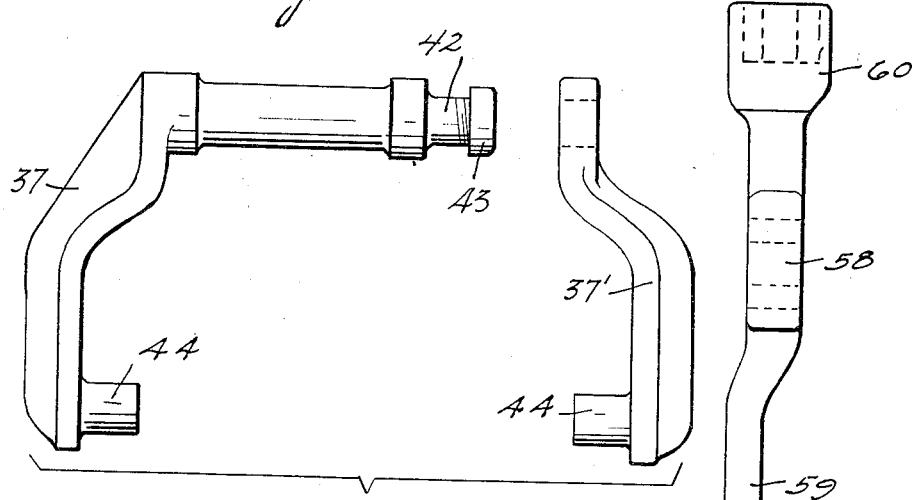
Figures 14, 15:
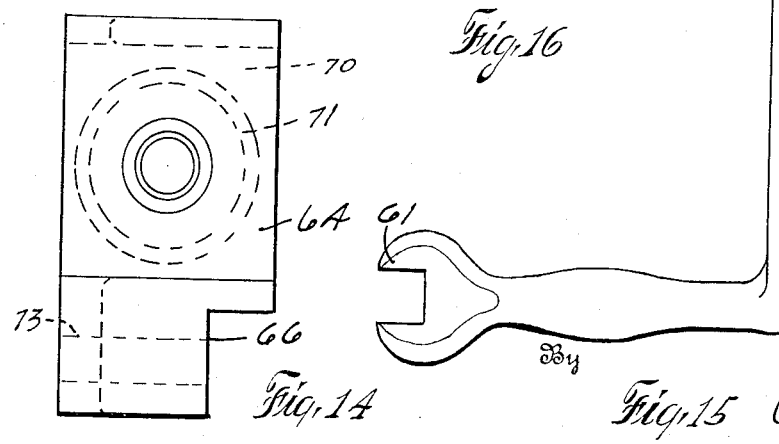
Figure 9:
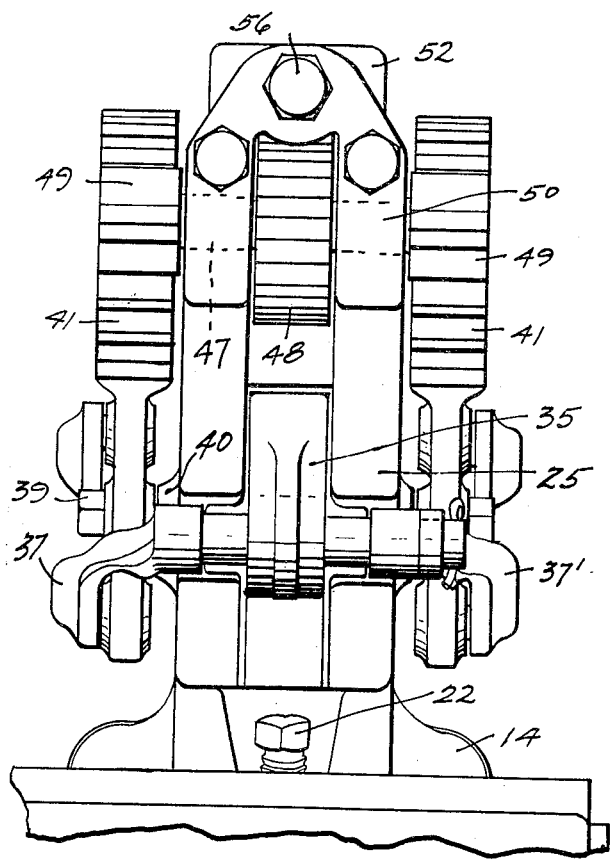
Figure 10:
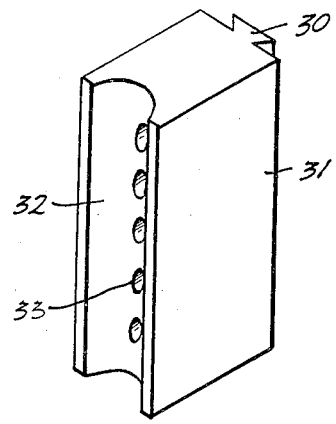
Figure 11:
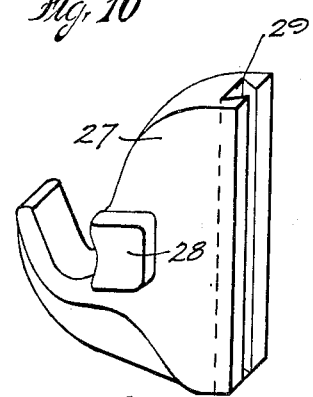
Figure 12:
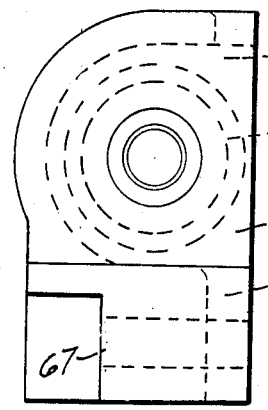
Figure 13:
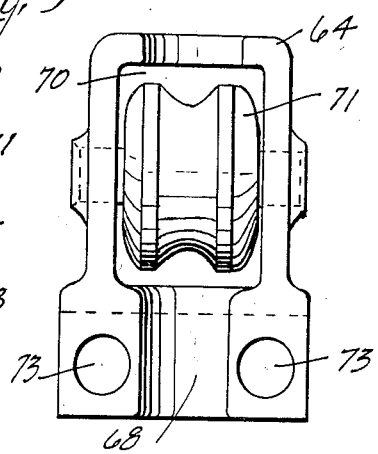

The invention will be more readily understood from a reading of the following specification and by reference to the accompanying drawings in which an example of the invention is shown, and wherein:

Figure 1 is a side elevation of an oil saver constructed in accordance with the invention and mounted in an adapter, which is shown partially in section and partially in elevation, Figure 2 is a vertical sectional view of the same, Figure 3 is a plan view, Figure 4 is a horizontal cross-sectional view taken on the line 4—4 of Figure 1, Figure 5 is a front elevation of the saver, Figure 6 is a partial inner elevation of one of the sections, Figure 7 is an inner face view of the base portion of one of the sections of the saver, Figure 8 is a side elevation of the same, Figure 9 is a view similar to Figure 5, the lower portion of the handle being omitted to show the packing member follower, Figure 10 is an isometrical view of one of the packing members, Figure 11 is a perspective view of one of the followers, Figure 12 is a side elevation of one of the removable guide roller hoods, Figure 13 is an inner face view of the same, Figure 14 is a side elevation of the other guide roller hood, Figure 15 is an elevation of the handle, and Figure 16 is a detail of one of the yokes.

In the drawings the numeral 10 designates a housing which is formed with a base or pedestal 11. The pedestal includes an integral front section 12 and a removable rear section 13 which are joined on a vertical diametrical plane. The base sections are provided with complementary ears 14 secured together by bolts 15 and nuts 16. The base 11 includes an annular inclined flange 17 which surrounds the reduced portion or neck of said base.

The housing includes an upper packing chamber A immediately above the neck of the base and a lower packing chamber B, which latter depends from the base and forms a part thereof. Diametrically opposite guides 18 (Figure 2) are provided in the chamber and receive sliding wedge blocks 19 resting against upright shoes 20. These shoes have their rear faces flat to receive the guide blocks and are suitably attached to semi-cylindrical packing members 21 formed of rubber for engaging around a cable or other element passing through the housing.

No separate claim is made to the lower packing, as it is substantially the same as set forth in my co-pending application hereinbefore referred to. Adjusting screws 22 are threaded through the flange 17 at the same angles as the walls of the guides 18. Each wedge block 19 has a keyhole slot 23 for receiving the lower end of one of the screws, whereby the blocks are suspended in the guides. By rotating the screws clockwise the blocks are slid downwardly and inwardly, thus displacing the shoes 20 inwardly and thereby compressing the packing members or sleeve 21 about the cable, rod or other element which passes through the device. The chamber B has an axial opening 24 at its bottom for receiving said cable.

The base has an axial opening 24' connecting the chambers A and B and through which the cable passes. The housing on each side of the chamber A has parallel side or cheek plates 25 extending from front to rear of the device. The chamber is produced between these plates and, as is shown in Figure 4, is comparatively narrow but extends transversely through the housing.

The cheek plates have at each end guide slots 26, and followers 27 (Figures 1, 4 and 11) are provided with guide lugs 28 on each side engaging in said slots, whereby the followers may be moved inwardly and outwardly in the chamber A. Each follower is provided with an upright dovetailed groove 29 (Figures 4 and 11) for receiving therein a dovetailed rib 30 (Figures 4 and 10) of a rectangular packing block or member 31. Each packing block is formed of rubber, or any material suitable for the purpose, and has a concaved vertical face or seat 32 for engaging around the cable, rod or the like. Grease pockets 33 may be provided in the face 32.

One of the followers 27 has an up-turned hook 34 and the other follower has a down-turned hook 35, and co-acting with each hook is a keeper 36, as is shown in Figure 2. Adjusting yokes 37 are engaged in these hooks and retained therein by the keepers. It will be seen that by disconnecting the yokes 37 from the hooks and swinging one up and the other down, the followers may be readily slid from the chamber A without dismantling or disconnecting the device in any other manner. When the followers are removed the packing blocks may be inspected and may be replaced when worn.

For operating the yokes, levers 38 are centrally pivoted on stud bolts 39 screwed into bosses 40 on the cheek plates, as is best shown in Figures 1 and 4. Each lever is formed integral with a gear segment 41, whereby it is swung. The yokes being attached to the levers on opposite sides of the pivots, it is obvious that by swinging the levers the yokes are drawn inward or pushed outward and accordingly slide the followers 27, whereby the packing blocks 31 grip or release the cable.

Each yoke 37 is formed with a removable link 37' which fits on a stud 42 at the outer end of the link, as is shown in Figure 16. The stud is screw-threaded and receives a nut 43, whereby the link is secured in place. The legs or links of each yoke are provided with inwardly directed trunnions 44 on their inner ends and they engage in apertures in the lever 38. It will be seen that by removing the nuts 42 the yokes may be disconnected from the hooks and the levers and gotten entirely out of the way, thus giving access to the followers and making for the easy removal of the latter.

At one side of the top of the housing an upright bracket 45 is formed integral therewith (Figures 1, 2, 3 and 9). This bracket is formed on its front side with a pair of bearing lugs 46 receiving a shaft 47, which has fastened thereon at its center a worm gear 48 and pinions 49 at each end, as is shown in Figures 2, 3, and 9. The shaft is confined by bearing caps 50 secured to the lugs by bolts 51 and connected by a yoke 52 integral therewith.

The bracket 45 is dished at 53 (Figure 2) to receive the worm gear 48, which is positioned between the lugs 46 and the caps 50. A worm screw 54 (Figure 2) has a trunnion 55 bearing in the upper end of the bracket 45 and meshing with the gear 48. The shank 56 of the screw is journaled in the yoke 52 and has a wrench end 57 receiving the socket 58 of a handle 59.

The handle 59 is one of the unique features of the invention and is illustrated in detail in Figure 15. On its upper end it has a socket 60 and on the outer end of its handle portion it is provided with a jaw 61. The sockets 58 and 60, together with the jaw 61 provide means for adjusting and turning all of the nuts, bolts and screws used on the device and no other tool is necessary; therefore, the handle is both a handle and a wrench. This is a very advantageous feature because a wrench having the proper size socket or jaw is not always available and this handle, forming a part of the device, is always at hand.

The pinions 49 mesh with the teeth of the segment 41. As is shown in Figures 1 and 3, the segments are elevated and the pinions are engaged with the outer or lower ends of said segments when the followers 27 are in their retracted positions. By this arrangement the segments are raised out of the way of the yokes 37, thus permitting the same to be freely manipulated for removing and replacing the followers and packing blocks. When the crank handle 59 is revolved in a clockwise direction the worm 54 will turn the worm gear 48 (Figure 2) in a counter-clockwise direction and the shaft 47 will be likewise rotated.

This will cause the pinions 49 (Figure 1) to be revolved in a counter-clockwise direction, whereby the segments 41 will be swung in clockwise direction (Figure 1). It will be seen that when the segments 41 are swung in a clockwise direction the levers 38 will be likewise swung, whereby the yokes 37 will be pulled inwardly, thus sliding the followers 27 and their blocks 31 toward each other to bring the latter into gripping position, as is shown in Figure 2. The segment has ample teeth to compensate for the wear of the blocks 31 and thus by the time the segments are swung to their downward limit the blocks 31 will have been completely worn out. A reverse movement of the parts will retract the followers, as is obvious.

The device illustrated is designed particularly for use with cables or rods and it is, therefore, important that a suitable guide be provided at the upper end of the device. Between the tops of the cheek plates 25 and the bracket 45 a transverse bar 62 is provided, as is shown in Figures 1 and 2, and on the opposite ends of the cheek plates upstanding ears 63 are formed. The followers and packing blocks 31, of course, slide under the bar 62 and below the ears 63. Removable hoods 64 and 65, respectively, are mounted on the upper end of the housing 10. The hood 64 is notched at 66 to receive the bar 62 (Figures 1, 2 and 14) and rests upon the upper edges of the cheek plates, as well as fitting against the inner side of the bracket 45.

The hood 65 is provided with recesses 67 (Figure 12) for receiving the ears 63 so as to rest upon the upper edges of the check plates and also fit between said ears. The hoods contact at the vertical center of the bore of the housing and each has concaved lower grooves 68 and upper grooves 69 forming a continuation of the bore 24 of the housing. Each hood has a chamber or recess 70 and a grooved guide roller 71 is journaled therein. The cable or rod which extends through the housing is engaged on opposite sides by these guide rollers.

Lag bolts 72 passing through the ears 63 and the hoods are engaged in screw-threaded sockets 73 in the bar 62. These bolts securely fasten the hoods in place and when the guide rollers become worn the hoods are easily taken off by removing the bolts. New hoods can be substituted or the worn rollers can be replaced and the hoods again fastened in position. This is a very important feature and prolongs the life of the oil saver, as well as increasing its efficiency.

In order to prevent leakage, the rear base section 13 is provided with packing strips 74 in its inner face, as is shown in Figure 7, for contacting with the inner face of the front section 12. The base flange 17 may be supported in the ordinary casing head, but in many instances it is preferable to connect the oil saver direct to the well tubing and for this purpose I have shown a reducer 75 having an internally screw-threaded collar 76 at its bottom. The reducer is flared upwardly from the collar and has an internal annular shoulder 77 for supporting the flange 17, whereby the chamber B depends within said reducer. The collar 76 is screwed onto the upper end of the well tubing (not shown) and the base flange is held on the shoulder by a set screw 78.

By removing the rear base section 13, the rear hood 65, and the rear follower 27 with its block 31, it is obvious that the cable or rod may be slipped in from the rear between the cheek plates 25, after which the said parts may be replaced and the oil saver lowered into the reducer. By this arrangement the oil saver may be readily placed in position or removed while the cable or rod is in place.

Two methods of disconnecting the yokes 37 have been described. One method is to tap the outer ends lightly with a hammer so as to spring said yokes past the keepers 36, the front yoke being swung down and the rear yoke being swung up. This would permit the followers to be pulled out of the housing. The preferable method is to remove the nut 43 and disconnect the yokes by taking off the link 37'. When this is done the keepers 36 can be given sufficient projection to prevent the yokes from being displaced from the hooks.

Various changes in the size and shape of the different parts, as well as modifications and alterations, may be made within the scope of the appended claims.

What I claim, is:

1. In an oil saver, a housing having a packing chamber, followers carrying compressible packing members and slidable transversely in the housing, segmental gear members mounted on the housing and elevated when the followers are retracted so as to permit free removal of the latter, and connections between the gear members and the followers for operating the latter.

2. In an oil saver, a housing having a packing chamber, followers carrying compressible packing members and slidable transversely in the housing, levers pivoted on opposite sides of the housing, yokes pivoted to the levers on opposite sides of the pivots of the latter and connected with the follower, gear segments integral with one end of each lever and overhanging the latter, the yokes being detachably connected with the lever and the follower.

3. In an oil saver, a housing having a packing chamber, packing members working in the chamber, segmental gears mounted on the housing, operating connections between the gears and the packing members, an upright bracket carried by the housing, a shaft journaled in the housing, caps for securing the shaft in place, pinions on the ends of the shaft engaging the segmental gears, and means for rotating the shaft.

4. In an oil saver, a housing having a packing chamber, packing members working in the chamber, segmental gears mounted on the housing, operating connections between the gears and the packing members, an upright bracket carried by the housing, a shaft journaled in the housing, caps for securing the shaft in place, pinions on the ends of the shaft engaging the segmental gears, a worm gear mounted on the shaft, a yoke connecting the caps, a worm screw journaled in the bracket and in the yoke, and a crank handle engaging the screw for operating it, said screw meshing with the worm gear.

5. In an oil saver, a housing having a packing chamber provided with parallel cheek plates on each side thereof, packing members slidable in the packing chamber between the cheek plates, a bar extending across the cheek plates at one end, upstanding ears on the opposite ends of the cheek plates, a pair of removable hoods mounted on the bar and the ears, bolts passing through the ears and the hoods and fastened in the bar, and guide rollers mounted in the hoods.

6. As a sub-combination in an oil saver, a follower member having a hook at its outer end and provided with guide lugs on each side, and a compressible packing block detachably secured to the inner face of the follower.

HARVEY R. STANDLEE.